US012398017B2

(12) United States Patent
Rajarapu et al.

(10) Patent No.: US 12,398,017 B2
(45) Date of Patent: Aug. 26, 2025

(54) METHOD AND APPARATUS FOR SECURING ELEVATOR SERVICE OVER A TELECOMMUNICATIONS NETWORK

(71) Applicant: Otis Elevator Company, Farmington, CT (US)

(72) Inventors: Ganesh Rajarapu, Telangana (IN); Jayapal Reddy Gireddy, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1318 days.

(21) Appl. No.: 16/950,029

(22) Filed: Nov. 17, 2020

(65) Prior Publication Data

US 2021/0147179 A1 May 20, 2021

(30) Foreign Application Priority Data

Nov. 20, 2019 (IN) ............................ 201911047399

(51) Int. Cl.

*B66B 1/46* (2006.01)
*B66B 1/34* (2006.01)
*B66B 5/00* (2006.01)

(52) U.S. Cl.

CPC ............ *B66B 1/468* (2013.01); *B66B 1/3461* (2013.01); *B66B 5/0006* (2013.01)

(58) Field of Classification Search

CPC ........ B66B 1/468; B66B 1/346; B66B 5/0006

(Continued)

(56) References Cited

U.S. PATENT DOCUMENTS

2018/0286100 A1* 10/2018 Brothers ............... A63F 13/822
2018/0346282 A1* 12/2018 Simcik .................. H04W 4/023
2018/0370761 A1* 12/2018 Huang .................. H04W 76/10

FOREIGN PATENT DOCUMENTS

KR 20190013661 A * 2/2019

OTHER PUBLICATIONS

"KONE RemoteCall"; Smartphone Application for KONE Polaris 900 Destination Control System; Retrieved Online from https://www.kone.com.au/Images/factsheet-kone-remotecall_tcm46-18641.pdf; Sep. 13, 2013; 2 Pages.

(Continued)

*Primary Examiner* — Jorge L Carrasquillo

(74) *Attorney, Agent, or Firm* — CANTOR COLBURN LLP

(57) ABSTRACT

Disclosed is a mobile device configured to communicate over a network with a controller of an elevator system, wherein the mobile device is configured to: initiate a service request call over the network to the controller; transmit, to the controller during the service request call, a service request for an elevator service at a first level; receive, from the controller, a first data including a reference number that is indicative of an elevator assignment assigned to an elevator car in response to the service request, wherein the elevator assignment instructs the elevator car to travel to the first level; automatically initiate a status update call over the network to the controller when the service request call terminates before receiving the elevator service; and transmit, to the controller during the status update call, a second data including the reference number without transmitting an additional service request for the elevator service.

20 Claims, 4 Drawing Sheets

(58) Field of Classification Search
USPC .......................................................... 187/380
See application file for complete search history.

(56) References Cited

OTHER PUBLICATIONS

European Search Report Issued in European Application No. 20209017.1-1017 dated Apr. 19, 2021; 6 Pages.

* cited by examiner

METHOD AND APPARATUS FOR SECURING ELEVATOR SERVICE OVER A TELECOMMUNICATIONS NETWORK

CROSS-REFERENCE TO RELATED APPLICATIONS

This application claims the benefit of IN Application No. 201911047399, filed Nov. 20, 2019, the disclosure of which is incorporated herein by reference in its entirety.

BACKGROUND

The embodiments herein relate to an elevator system and more specifically to method and apparatus for securing elevator service over a telecommunications network.

A passenger may utilize a mobile device to communicate over a telecommunications network (network) for the purpose of establishing a network communication link (link) with an electronic control hub (hub) of an elevator system. Once the link is established, the passenger may utilize the mobile device to transmit a service request to the hub over the link. The request may identify for example an onboarding floor. In response the hub assign an elevator to provide the requested service. The link may remain active until the passenger receives the elevator service. If the link over the network degrades, a new link may be established between the mobile device and the hub. Once the new link is established, the passenger may utilize the mobile device to transmit a new service request to the hub. This may lead to unwanted service delays for the passenger.

BRIEF SUMMARY

Disclosed is a mobile device configured to communicate over a network with a controller of an elevator system, wherein the mobile device is further configured to: initiate a service request call over the network to the controller; transmit, to the controller during the service request call, a service request for an elevator service at a first level; receive, from the controller, a first data including a reference number that is indicative of an elevator assignment that is assigned to an elevator car in response to the service request, wherein the elevator assignment instructs the elevator car to travel to the first level; automatically initiate a status update call over the network to the controller when the service request call terminates before receiving the elevator service; and transmit, to the controller during the status update call, a second data including the reference number without transmitting an additional service request for the elevator service.

In addition to one or more of the above disclosed aspects or as an alternate the mobile device is configured to receive, from the controller during the status update call and after transmitting the second data including the reference number, a status update on the service request indicative of an estimated time of arrival of the elevator car at the first level pursuant to the elevator assignment.

In addition to one or more of the above disclosed aspects or as an alternate the mobile device is configured so that prior to initiating the status update call, the mobile device determines that the service request call terminated before receiving the elevator service due to a degraded link over the network.

In addition to one or more of the above disclosed aspects or as an alternate the mobile device is configured so that upon determining that the service request call terminated due to the degraded link, the mobile device displays a user message indicating that a further service request is unnecessary to receive the elevator service.

In addition to one or more of the above disclosed aspects or as an alternate the mobile device is configured so that during the service request call and the status update call the mobile device receives periodic status updates indicative of the estimated time of arrival of the elevator car at the first level pursuant to the elevator assignment.

In addition to one or more of the above disclosed aspects or as an alternate the mobile device is configured to display indicia indicative of the periodic status updates.

In addition to one or more of the above disclosed aspects or as an alternate the mobile device is configured to communicate with the controller over WiFi and cellular networks.

Further disclosed is an elevator system comprising a controller configured to communicate with a mobile device having one or more of the above disclosed features over the network to engage in the status call, the controller being further configured to: receive from the mobile device the second data including the reference number that is indicative of the elevator assignment that is assigned to the elevator car in response to the service request, wherein the elevator assignment instructs the elevator car to travel to the first level; communicate with the elevator car to receive the status update of the elevator car in executing the elevator assignment, wherein the status update is indicative of the estimated time of arrival of the elevator car at the first level pursuant to the elevator assignment; and transmit the status update to the mobile device.

In addition to one or more of the above disclosed aspects or as an alternate the controller is configured so that during the status update call, the controller periodically communicates with the elevator car to request status updates indicative of the estimated time of arrival of the elevator car at the first level pursuant to the elevator assignment, and transmit the status updates to the mobile device.

In addition to one or more of the above disclosed aspects or as an alternate the controller is configured to communicate with the elevator car over a CAN network.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
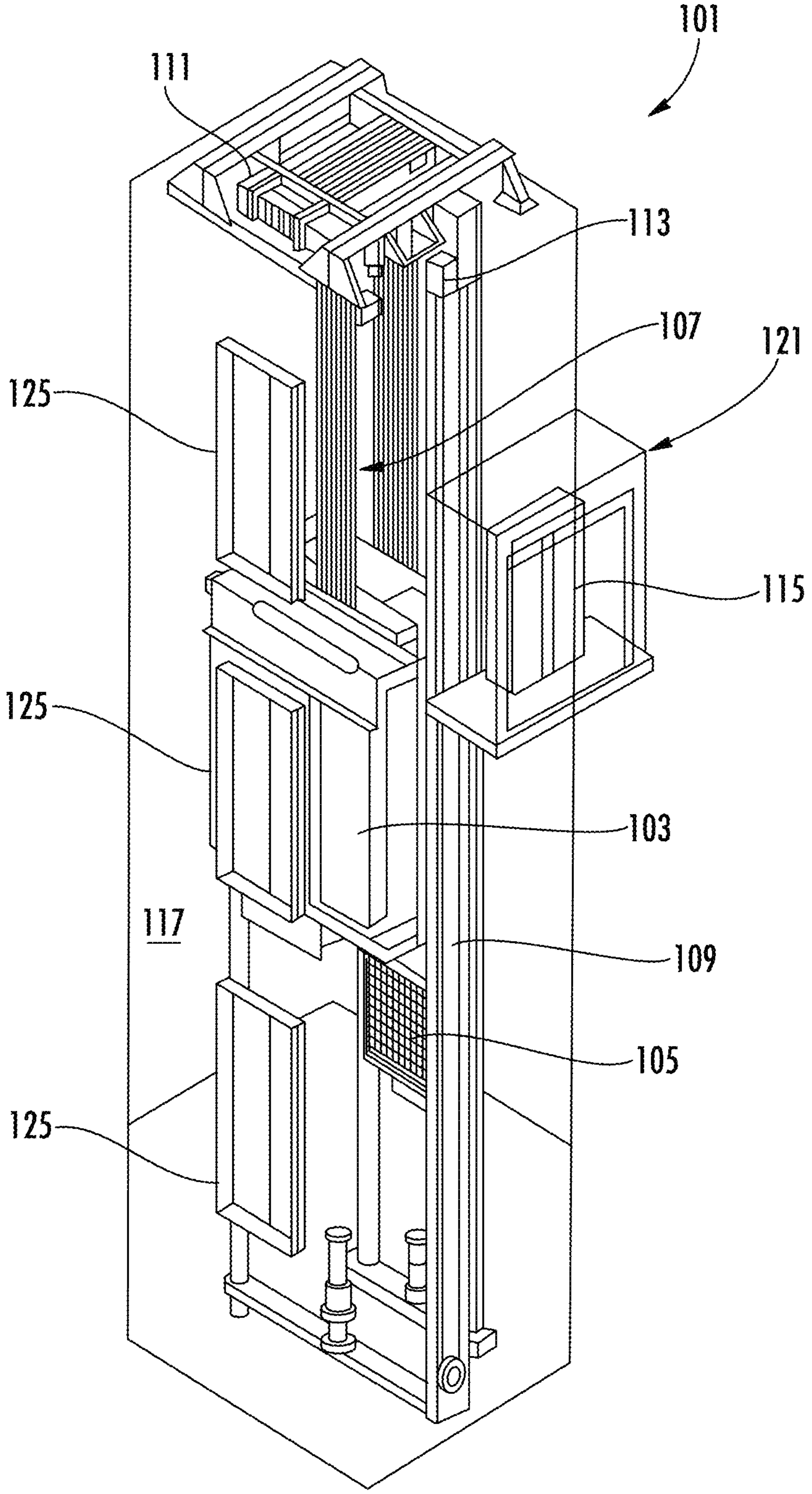
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
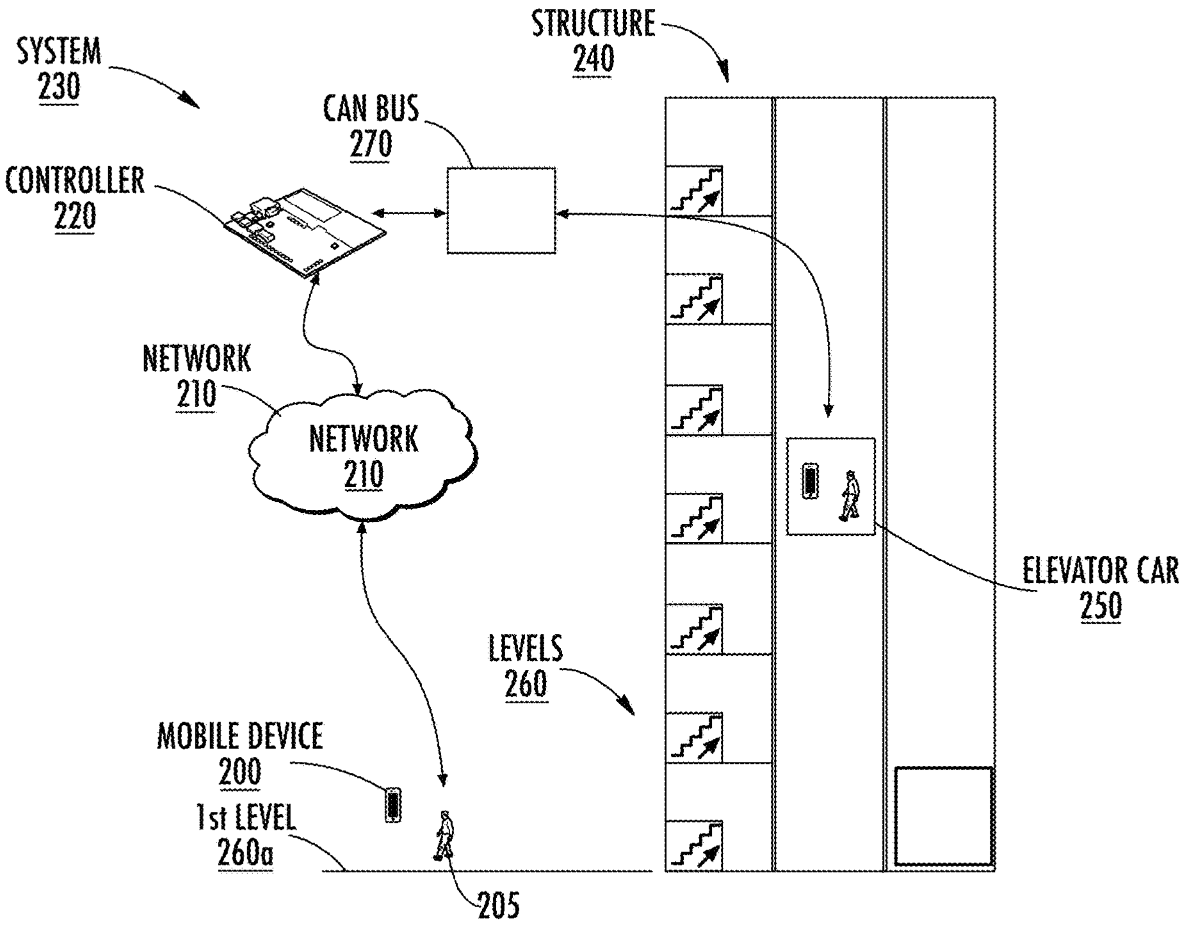
FIG. 2 further illustrates an elevator system that may employ various embodiments of the present disclosure.

Turning to FIG. 2, a mobile device 200 associated with a passenger 205 is configured to communicate over a telecommunications network 210 with a controller 220 of an elevator system 230 in an architectural structure 240. The telecommunications network may be WiFi, cellular, or other form of telecommunications such as a personal area network and may be a combination of such networks. The architectural structure 240 may be a residential building, an office building, a hospital or other structure with an elevator system 230 therein.

The elevator system 230 may be the same as the elevator system 101 of FIG. 1 and includes an elevator car 250. The controller 220 is configured to control the elevator car 250 to travel between a plurality of levels 260 in the architectural structure 240. The controller 220 may communicate with the elevator car 250 via, e.g., a CAN bus 270 or similar network platform.

Figure 3:
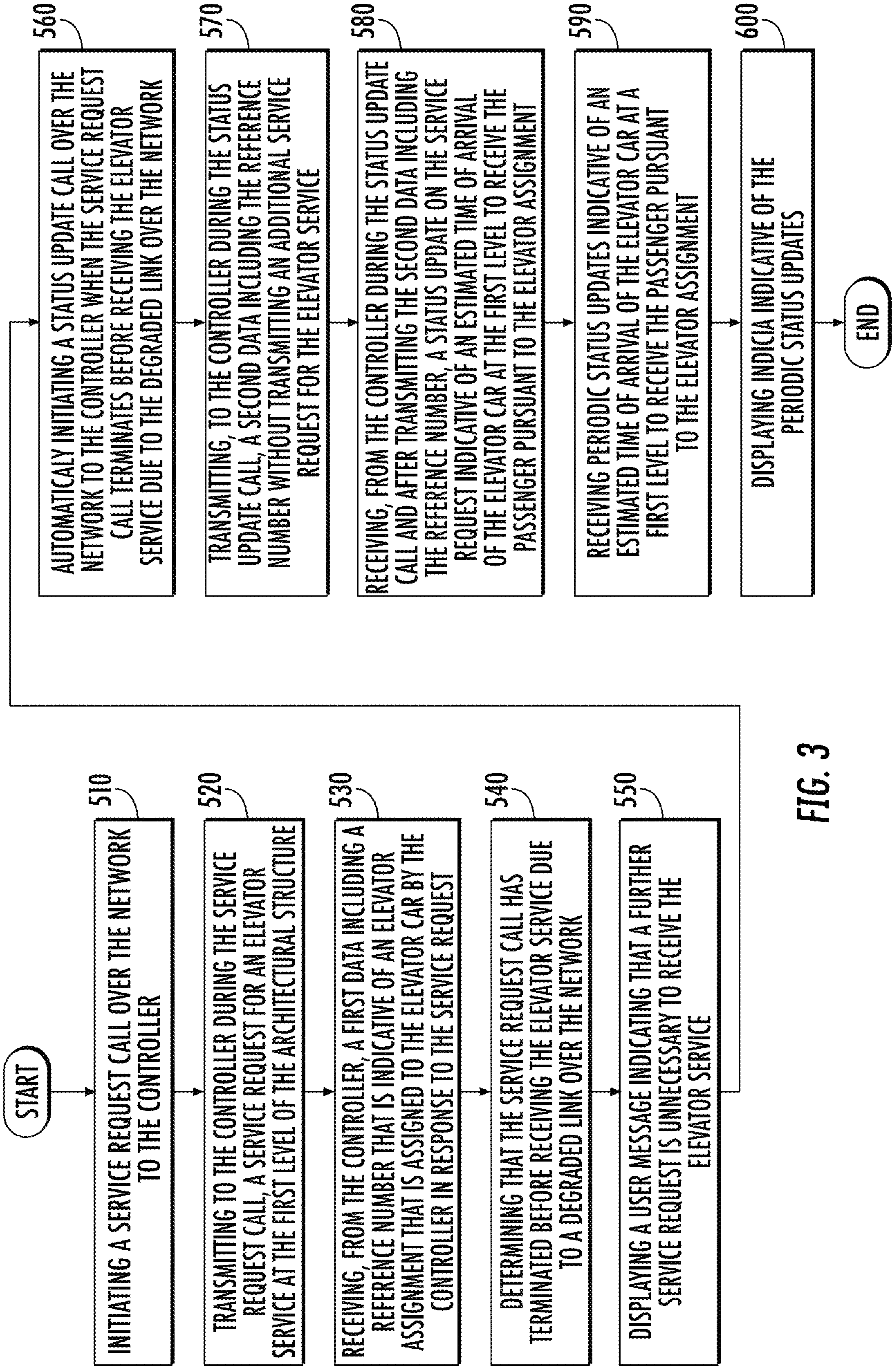
FIG. 3 is a flowchart showing a method executed by a mobile device of securing elevator service according to a disclosed embodiment.

In the illustrated embodiment the passenger 205 requires elevator service at a first level **260*a*. Accordingly, FIG. 3 is a flowchart showing a method executed by the mobile device 200 of securing elevator service according to a disclosed embodiment. As shown in block 510 the method may include the mobile device 200 initiating a service request call over the telecommunications network 210 to the controller 220. As shown in block 520 the method may include the mobile device 200 transmitting to the controller 220 during the service request call, a service request for an elevator service for the passenger 205 at the first level 260*a* of the architectural structure 240**.

As shown in block 530 the method may include the mobile device 200 receiving, from the controller, a first data. The first data includes a reference number that is indicative of an elevator assignment that is assigned to the elevator car 250 by the controller 220 in response to the service request. According to an embodiment the elevator assignment instructs the elevator car 250 to travel to the first level **260*a* for receiving the passenger 205**.

As shown in block 540 the method may include the mobile device 200 determining, prior to initiating the status update call, that the service request call terminated before receiving the elevator service due to a degraded telecommunications link over the telecommunications network 210. As shown in block 550 the method may include the mobile device 200 displaying a user message indicating that a further service request is unnecessary to receive the elevator service. Such message may include "You just lost a network connection. But your elevator is on the way. When you are online, you will receive a live status update of your assigned elevator. Do not place a new call again". This also occurs upon the mobile device 200 determining that the service request call terminated due to the degraded telecommunications link over the telecommunications network 210. As shown in block 560 the method may include the mobile device 200 automatically initiating a status update call over the telecommunications network 210 to the controller 220. The mobile device 200 may monitor for an available network connection when attempting to perform this aspect of the method. This also occurs when the service request call terminates before receiving the elevator service due to the degraded telecommunications link over the telecommunications network 210.

As shown in block 570 the method may include the mobile device 200 transmitting, to the controller 220 during the status update call, a second data including the reference number. This occurs without the mobile device 200 transmitting an additional service request for the elevator service. As shown in block 580 the method may include the mobile device 200 receiving, from the controller 220 during the status update call and after transmitting the second data including the reference number, a status update on the service request. The status update is indicative of an estimated time of arrival of the elevator car 250 at the first level 260*a* to receive the passenger 205 pursuant to the elevator assignment.

As shown in block 590 the method may include the mobile device 200 receiving periodic status updates indicative of the estimated time of arrival of the elevator car 250 at the first level 260*a* to receive the passenger 205 pursuant to the elevator assignment. This occurs during the service request call and the status update call by the mobile device 200. As shown in block 600 the method may include the mobile device 200 displaying indicia indicative of the periodic status updates.

Figure 4:
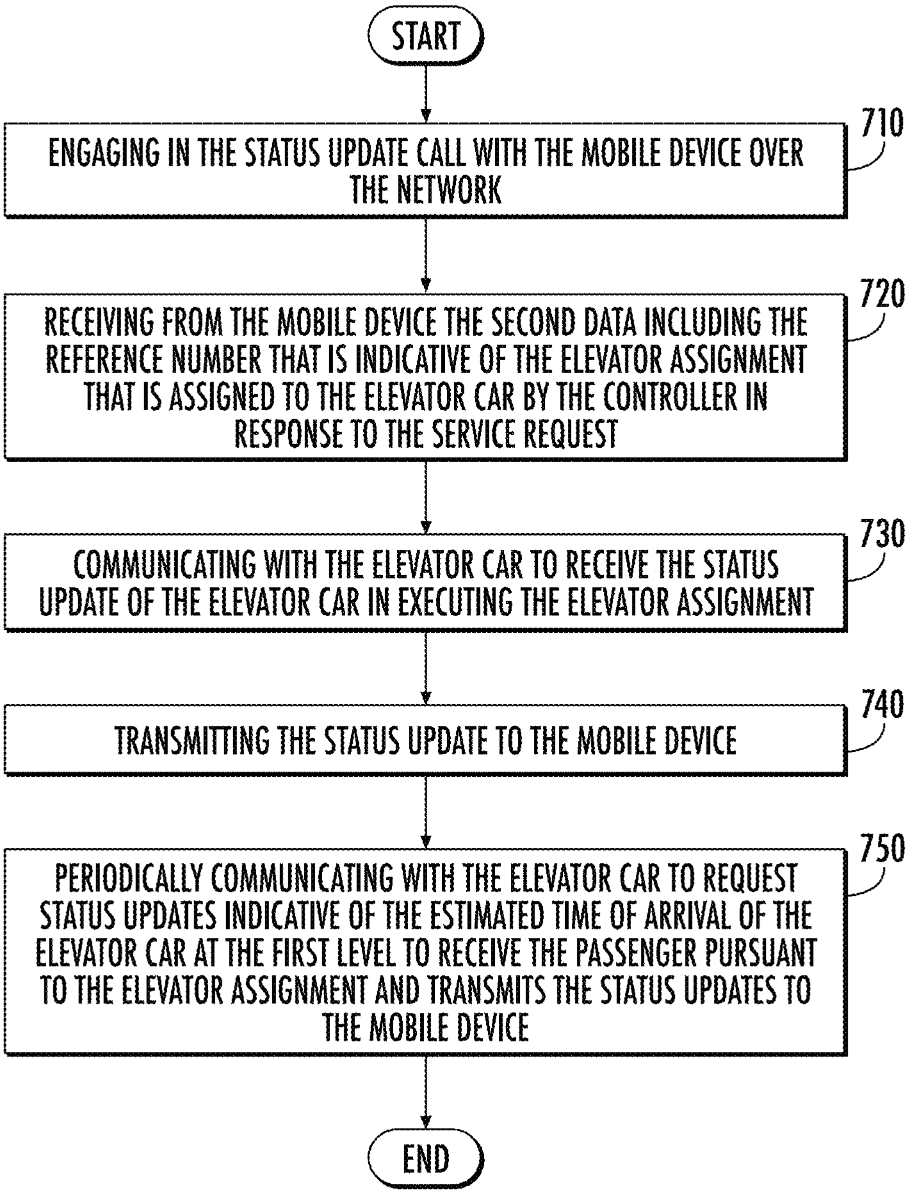
FIG. 4 is a flowchart showing a method executed by a controller, in response to the method executed by the mobile device, of securing elevator service according to a disclosed embodiment.

Accordingly, FIG. 4 is a flowchart showing a method that may be executed by the controller 220 of securing elevator service according to a disclosed embodiment. The controller 220 may execute this method in response to the mobile device 200 executing the method shown in the flowchart of FIG. 3.

As shown in block 710 the method may include the controller 220 engaging in the status update call with the mobile device 200 over the telecommunications network 210. As shown in block 720 the method may include the controller 220 receiving from the mobile device 200 the second data including the reference number that is indicative of the elevator assignment. As indicated the elevator assignment is assigned to the elevator car 250 by the controller 220 in response to the service request, and the elevator assignment instructs the elevator car 250 to travel to the first level 260*a* for receiving the passenger 205.

As shown in block 730 the method may include the controller 220 communicating with the elevator car 250 to receive the status update of the elevator car 250 in executing the elevator assignment. The status update is indicative of the estimated time of arrival of the elevator car 250 at the first level 260*a* to receive the passenger 205 pursuant to the elevator assignment. As shown in block 740 the method may include the controller 220 transmitting the status update to the mobile device 200.

As shown in block 750 the method may include the controller 220 periodically communicating with the elevator car 250 to request status updates. Such status updates are also indicative of the estimated time of arrival of the elevator car 250 at the first level 260*a* to receive the passenger 205 pursuant to the elevator assignment. Block 710 further includes transmitting the status updates to the mobile device 200. This occurs during the status update call.

According to the above disclosed embodiments, when a service request call is registered successfully a unique ID is generated by the controller, which is transmitted back to the mobile device along with elevator assignment and status updates. When the mobile device recognizes a network state changes (lost/restored call, transition from cellular to Wi-Fi and vice versa), the embodiments utilize popup-display messages on the mobile device instructing the passenger to not place a new service call. Such messages may include "You just lost a network connection. But your elevator is on the way. When you are online, you will receive a live status update of your assigned elevator. Do not place a new call again". When the network connection is restored, mobile phone is able to receive updates regarding the elevator service by utilizing the reference ID and without placing a new service call.

As used herein, "mobile devices" may contain one or more processors capable of communication using with other such devices by applying wired and/or wireless telecommunication protocols. Non-limiting examples of a smart device include a mobile phone, personal data assistant (PDA), tablet, watch, wearable or other processor-based devices. Protocols applied by smart devices may include local area network (LAN) protocols and/or a private area network (PAN) protocols. LAN protocols may apply WiFi technology, which is a technology based on the Section 802.11 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols may also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Wireless protocols may further include short range communication (SRC) protocols, which may be utilized with radio-frequency identification (RFID) technology. RFID may be used for communicating with an integrated chip (IC) on an RFID smartcard. Wireless protocols may further include long range, low powered wide area network (LoRa and LPWAN) protocols that enable low data rate communications to be made over long distances by sensors and actuators for machine-to-machine (M2M) and Internet of Things (IoT) applications.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A mobile device configured to communicate over a network with a controller of an elevator system, wherein the mobile device is further configured to:

initiate a service request call over the network to the controller;

transmit, to the controller during the service request call, a service request for an elevator service at a first level;

receive, from the controller, a first data including a reference number that is indicative of an elevator assignment that is assigned to an elevator car in response to the service request, wherein the elevator assignment instructs the elevator car to travel to the first level;

automatically initiate a status update call over the network to the controller when the service request call terminates before receiving the elevator service; and transmit, to the controller during the status update call, a second data including the reference number without transmitting an additional service request for the elevator service.

2. The mobile device of claim 1, wherein the mobile device is configured to receive, from the controller during the status update call and after transmitting the second data including the reference number, a status update on the service request indicative of an estimated time of arrival of the elevator car at the first level pursuant to the elevator assignment.

3. The mobile device of claim 2, wherein the mobile device is configured to communicate with the controller over WiFi and cellular networks.

4. The mobile device of claim 2, wherein the mobile device is configured so that prior to initiating the status update call, the mobile device determines that the service request call terminated before receiving the elevator service due to a degraded link over the network.

5. The mobile device of claim 4, wherein the mobile device is configured so that upon determining that the service request call terminated due to the degraded link, the mobile device displays a user message indicating that a further service request is unnecessary to receive the elevator service.

6. The mobile device of claim 5, wherein the mobile device is configured so that during the service request call and the status update call the mobile device receives periodic status updates indicative of the estimated time of arrival of the elevator car at the first level pursuant to the elevator assignment.

7. The mobile device of claim 6, wherein the mobile device is configured to display indicia indicative of the periodic status updates.

8. An elevator system comprising a controller configured to communicate with the mobile device of claim 7 over the network to engage in the status call, the controller being further configured to:

receive from the mobile device the second data including the reference number that is indicative of the elevator assignment that is assigned to the elevator car in response to the service request, wherein the elevator assignment instructs the elevator car to travel to the first level;

communicate with the elevator car to receive the status update of the elevator car in executing the elevator assignment, wherein the status update is indicative of the estimated time of arrival of the elevator car at the first level pursuant to the elevator assignment; and transmit the status update to the mobile device.

9. The elevator system of claim 8, wherein the controller is configured so that during the status update call, the controller periodically communicates with the elevator car to request status updates indicative of the estimated time of arrival of the elevator car at the first level pursuant to the elevator assignment, and transmit the status updates to the mobile device.

10. The elevator system of claim 9, wherein the controller is configured to communicate with the elevator car over a CAN network.

11. A method of requesting elevator service from a mobile device, comprising:

initiating a service request call over a network to a controller of an elevator system;

transmitting, to the controller during the service request call, a service request for an elevator service at a first level;

receiving, from the controller, a first data including a reference number that is indicative of an elevator assignment that is assigned to an elevator car in response to the service request, wherein the elevator assignment instructs the elevator car to travel to the first level;

automatically initiating a status update call over the network to the controller when the service request call terminates before receiving the elevator service, and transmitting, to the controller during the status update call, a second data including the reference number without transmitting an additional service request for the elevator service.

12. The method of claim 11, wherein the mobile device is configured to receive, from the controller during the status update call and after transmitting the second data including the reference number, a status update on the service request indicative of an estimated time of arrival of the elevator car at the first level pursuant to the elevator assignment.

13. The method of claim 12, wherein the mobile device is configured to communicate with the controller over WiFi and cellular networks.

14. The method of claim 12, wherein the mobile device is configured so that prior to initiating the status update call, the mobile device determines that the service request call terminated before receiving the elevator service due to a degraded link over the network.

15. The method of claim 14, wherein the mobile device is configured so that upon determining that the service request call terminated due to the degraded link, the mobile device displays a user message indicating that a further service request is unnecessary to receive the elevator service.

16. The method of claim 15, wherein the mobile device is configured so that during the service request call and the status update call the mobile device receives periodic status updates indicative of the estimated time of arrival of the elevator car at the first level pursuant to the elevator assignment.

17. The method of claim 16, wherein the mobile device is configured to display indicia indicative of the periodic status updates.

18. A method of providing elevator service by an elevator system, the elevator system including a controller configured to communicate with the mobile device executing the method of claim 17 over the network to engage in the status call, the method comprising the controller:

receiving from the mobile device the second data including the reference number that is indicative of the elevator assignment that is assigned to the elevator car in response to the service request, wherein the elevator assignment instructs the elevator car to travel to the first level;

communicating with the elevator car to receive the status update of the elevator car in executing the elevator assignment, wherein the status update is indicative of the estimated time of arrival of the elevator car at the first level pursuant to the elevator assignment; and transmitting the status update to the mobile device.

19. The method of claim 18, wherein the controller is configured so that during the status update call, the controller periodically communicates with the elevator car to request status updates indicative of the estimated time of arrival of the elevator car at the first level pursuant to the elevator assignment, and transmit the status updates to the mobile device.

20. The method of claim 19, wherein the controller is configured to communicate with the elevator car over a CAN network.

* * * * *